(12) United States Patent
Roesener et al.

(10) Patent No.: US 12,424,028 B2
(45) Date of Patent: Sep. 23, 2025

(54) METHOD AND SYSTEM FOR MONITORING A PASSENGER IN A VEHICLE

(71) Applicant: Robert Bosch GmbH, Stuttgart (DE)

(72) Inventors: Benno Roesener, Stuttgart (DE); Klaus Hammer, Kilstett (FR)

(73) Assignee: ROBERT BOSCH GMBH, Stuttgart (DE)

( * ) Notice: Subject to any disclaimer, the term of this patent is extended or adjusted under 35 U.S.C. 154(b) by 1 day.

(21) Appl. No.: 18/529,203

(22) Filed: Dec. 5, 2023

(65) Prior Publication Data
US 2024/0193991 A1 Jun. 13, 2024

(30) Foreign Application Priority Data
Dec. 8, 2022 (DE) ...................... 10 2022 213 278.5

(51) Int. Cl.
*G06V 40/20* (2022.01)
*G06V 20/40* (2022.01)
*G06V 20/59* (2022.01)
*G06V 40/10* (2022.01)

(52) U.S. Cl.
CPC ............ *G06V 40/20* (2022.01); *G06V 20/593* (2022.01); *G06V 40/10* (2022.01); *G06V 20/41* (2022.01)

(58) Field of Classification Search
None
See application file for complete search history.

(56) References Cited

U.S. PATENT DOCUMENTS

| | | | | |
|---|---|---|---|---|
| 6,963,292 | B1 * | 11/2005 | White | G08B 25/12 |
| | | | | 340/963 |
| 9,293,042 | B1 * | 3/2016 | Wasserman | G08G 1/09 |
| 9,986,405 | B1 * | 5/2018 | Cardonha | H04W 4/70 |
| 10,543,799 | B1 * | 1/2020 | Werner | B64D 45/0015 |
| 11,958,608 | B1 * | 4/2024 | Tran | H04N 21/214 |
| 12,208,805 | B2 * | 1/2025 | Barcia | B60W 30/10 |
| 2006/0055512 | A1 * | 3/2006 | Chew | G07C 9/37 |
| | | | | 705/13 |
| 2011/0295466 | A1 * | 12/2011 | Ostu | B60N 2/242 |
| | | | | 374/45 |

(Continued)

FOREIGN PATENT DOCUMENTS

| | | | | |
|---|---|---|---|---|
| CN | 111915956 | A * | 11/2020 | ............... G09B 9/05 |
| CN | 113178112 | A * | 7/2021 | |

(Continued)

*Primary Examiner* — Ricky Chin
(74) *Attorney, Agent, or Firm* — NORTON ROSE FULBRIGHT US LLP

(57) ABSTRACT

A method for monitoring a passenger in a vehicle. The method includes: receiving data from an observation device and/or data from a login of the passenger to a local network of the vehicle; identifying the passenger in the vehicle using the received data; assigning the passenger to a seat in the vehicle; tracking the passenger in the event of a possible change of seat to a new seat; updating the assignment of the passenger to a new seat when a change of seat to a new seat is detected; detecting inputs and/or gestures of the passenger and ascertaining whether the passenger wants to trigger or is triggering an alarm; sending relevant information about the passenger and the current seat to an external server when it is detected that the passenger wants to trigger or has triggered an alarm.

11 Claims, 11 Drawing Sheets

(56) References Cited

U.S. PATENT DOCUMENTS

| | | | |
|---|---|---|---|
| 2012/0010910 A1* | 1/2012 | Lele | G06Q 40/00 |
| | | | 705/5 |
| 2015/0073842 A1* | 3/2015 | Aljabarti | G06Q 10/02 |
| | | | 705/5 |
| 2017/0113801 A1* | 4/2017 | Brunaux | B64D 11/00 |
| 2017/0316533 A1* | 11/2017 | Goldman-Shenhar | |
| | | | G08G 1/205 |
| 2019/0225080 A1* | 7/2019 | Mueller | B60W 30/146 |
| 2020/0171977 A1* | 6/2020 | Jales Costa | B60N 2/002 |
| 2021/0049912 A1* | 2/2021 | Perez Barrera | G08G 1/0965 |
| 2021/0266741 A1* | 8/2021 | Kwatra | H04W 12/06 |
| 2021/0279740 A1* | 9/2021 | Choi | H04W 4/44 |
| 2022/0269998 A1* | 8/2022 | Harrington | G06Q 50/40 |
| 2023/0024865 A1* | 1/2023 | Guy | A61B 5/6887 |
| 2024/0002057 A1* | 1/2024 | Satsukawa | B64D 11/06 |
| 2024/0104450 A1* | 3/2024 | Panjer | G06Q 10/04 |
| 2024/0127607 A1* | 4/2024 | Zhang | G06T 7/70 |
| 2024/0155320 A1* | 5/2024 | Barcia | H04W 4/90 |
| 2024/0193991 A1* | 6/2024 | Roesener | G06V 40/10 |
| 2024/0396972 A1* | 11/2024 | Shi | H04W 4/40 |

FOREIGN PATENT DOCUMENTS

| | | |  | |
|---|---|---|---|---|
| DE | 102014219692 A1 | 10/2015 | | |
| DE | 102015006814 A1 | 12/2015 | | |
| DE | 102014214352 A1 | 1/2016 | | |
| DE | 102021001374 A1 | 4/2021 | | |
| EP | 3521166 A1 * | 8/2019 | | A61B 5/0004 |
| JP | 2018041238 A * | 3/2018 | | |

* cited by examiner

METHOD AND SYSTEM FOR MONITORING A PASSENGER IN A VEHICLE

CROSS REFERENCE

The present application claims the benefit under 35 U.S.C. § 119 of German Patent Application No. DE 10 2022 213 278.5 filed on Dec. 8, 2022, which is expressly incorporated herein by reference in its entirety.

BACKGROUND INFORMATION

A method and an arrangement for operating an occupant observation system is described in German Patent Application No. DE 10 2014 214 352 A1.

SUMMARY

The present invention relates to a method for monitoring a passenger in a vehicle. According to an example embodiment of the present invention, the method comprises the steps:
receiving data from an observation device and/or data from a login of the passenger to a local network of the vehicle, identifying the passenger in the vehicle by means of the received data,
assigning the passenger to a seat in the vehicle,
tracking the passenger in the event of a possible change of seat to a new seat,
updating the assignment of the passenger to a new seat when a change of seat to the new seat is detected,
detecting inputs and/or gestures of the passenger and ascertaining whether the passenger wants to trigger or is triggering an alarm,
sending relevant information about the passenger and the current seat to an external server when it is detected that the passenger wants to trigger or has triggered an alarm.

An advantage of the present invention is that a passenger can be reliably identified and his or her seat can be tracked. This means that, when an alarm is triggered, the passenger who triggers the alarm can be helped in a targeted manner. This in particular makes it possible to increase the safety in the vehicle, because the person who is feeling threatened, for example, or is suffering a health emergency can in particular be helped more quickly and/or in a more targeted manner. Passengers can thus advantageously feel safer and more comfortable. This can in particular increase safety in the vehicle.

In one example embodiment of the present invention, in the step of identifying the passenger in a vehicle, information about a name, a gender, an age and/or a photo of the passenger can be provided. In a further development, in the step of sending relevant information about the passenger and the current seat to an external server, information about the passenger, about the passenger's trip, about possible further passengers and/or about the vehicle can be sent. If a passenger triggers an alarm, the information can advantageously be used to help them in a targeted and/or reliable manner. This can in particular increase the safety of the passengers in the vehicle.

In an advantageous embodiment of the present invention, the method comprises a further step of observing the passenger by means of an observation device. This in particular makes it possible to securely and/or reliably generate observation data by means of which the passenger can be identified in the vehicle and/or assigned a seat. The passenger can furthermore in particular be observed or tracked reliably in the event of a possible change of seat. This in particular makes it possible to securely and/or reliably monitor a passenger.

Advantageously, a pose of the passenger can be estimated in order to track the passenger through a possible change of seat. The estimation of the pose can in particular be used to securely and/or reliably detect a change of seat.

In one example configuration of the present invention, the method can further comprise a step of outputting information when a triggering of an alarm by the passenger is detected, wherein the information is output by means of one or more user interfaces. In a further development, the one or more user interfaces can be configured as an output device and/or as an interface to the passenger's smartphone. It is thus in particular possible to securely and/or reliably output information to a passenger. The passenger can thus in particular be informed securely and/or reliably.

The information output can advantageously be visible only to the passenger who triggered the alarm. The other passengers will therefore not be able to see that the passenger has triggered an alarm. This can be advantageous in a threat situation, for example, because the person threatening the passenger does not realize that an alarm has been triggered, which could escalate the situation. This can in particular increase safety in the vehicle.

In a further development of the present invention, the method can comprise a step of adjusting a configuration of the seat depending on the identified passenger. This allows the configurations of the seat to be individually adapted to the passenger. Moreover, if the passenger changes to another seat, the configuration of the new seat can in particular be adapted as well. This can advantageously increase comfort for the passenger. In a vehicle interior with multiple seats, this advantageously makes it possible to enable the unrestricted use of user interfaces at the seat and the associated services for a passenger, even after the passenger has changed seats within the vehicle.

Also provided according to the present invention is a system for monitoring a passenger in a vehicle. According to an example embodiment of the present invention, the method comprises a receiving unit configured to receive data from an observation device and/or data from a login of the passenger to a local network of the vehicle, comprising a computing unit configured to identify the passenger in a vehicle, to assign the passenger to a seat in the vehicle, to track the passenger through a possible change of seat to a new seat, to update the assignment of the passenger to the new seat when a change of seat to the new seat is detected, and to detect inputs and/or gestures of the passenger and ascertaining whether the passenger wants to trigger or is triggering an alarm, and comprising a transmitting device configured to send relevant information about the passenger and the current seat to an external server when it is detected that the passenger wants to trigger or has triggered an alarm.

An advantage of the present invention is that a passenger can be reliably identified and his or her seat can be tracked, in particular in the event of a change. This means that, when an alarm is triggered, the passenger who triggers the alarm can be helped in a targeted manner. This in particular makes it possible to increase the safety in the vehicle, because the person who is feeling threatened, for example, or is suffering a health emergency can in particular be helped more quickly and/or in a more targeted manner. This can in particular increase safety in the vehicle.

In a further development of the present invention, the system can comprise an observation device for observing the passenger, wherein the passenger can be identified by means of data from the observation device. This in particular makes it possible to observe the passenger securely and/or reliably, as a result of which the passenger can in particular be identified securely and/or reliably and/or assigned to a seat in the vehicle. The passenger can moreover advantageously be observed or tracked reliably in the event of a possible change of seat.

In one example embodiment of the present invention, the system can comprise one or more user interfaces, wherein the passenger can provide inputs via the one or more user interfaces and/or wherein information can be presented to the passenger via the one or more user interfaces. In a further development, the one or more user interfaces can be configured as an output device and/or as an interface to the passenger's smartphone. It is thus in particular possible to securely and/or reliably output information to a passenger. The passenger can thus in particular be informed securely and/or reliably.

BRIEF DESCRIPTION OF THE DRAWINGS

Embodiment examples of the present invention are shown in the drawings and explained in more detail in the following descriptions. The same reference signs are used for the elements which are shown in the various figures and have a similar effect, whereby a repeated description of these elements is omitted.

DETAILED DESCRIPTION OF EXAMPLE EMBODIMENTS

Figure 1:
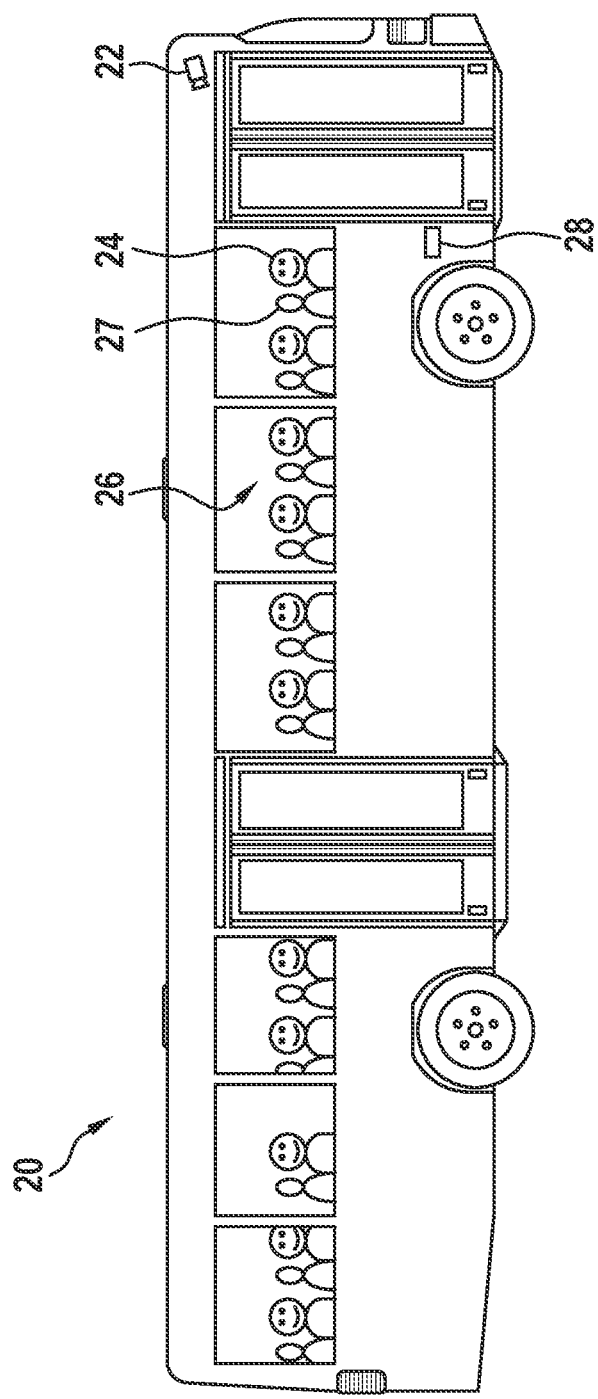
FIG. 1 shows a schematic illustration of a vehicle comprising a device for observing a vehicle occupant.

FIG. 1 shows a schematic illustration of a vehicle 20, for example a motor vehicle, comprising an observation device 22 for observing one or more passengers 24 or vehicle occupants 24. The vehicle can in particular be configured to transport multiple passengers; the vehicle can be a taxi, a car, a shared autonomous vehicle, a robotaxi, a transport vehicle, a bus or another vehicle for transporting multiple passengers, for instance. The vehicle can also be configured as a train and/or a tram, for example. The vehicle 20 in particular comprises an interior space 26 or a vehicle interior 26, wherein in particular one or more seats 27 for one or more vehicle occupants 24 can be disposed in the vehicle interior 26. The vehicle 20 further comprises an observation device 22 for observing the vehicle interior 26 and/or one or more vehicle occupants 24, for example a driver and/or a front seat passenger and/or one or more other passengers. The observation device 22 can also be referred to as an observation system, a driver monitoring system, an occupant observation system and/or a monitoring system. The observation device 22 can, for example, be configured to acquire a gaze direction, a body posture and/or the position of the head or face or eyes of the vehicle occupant 24, or the state of tiredness and/or other vital signs of the vehicle occupant 24. It is, for example, also possible to acquire an identity of the vehicle occupant 24.

The observation device 22 can be in particular be disposed in a dashboard, in an instrument panel, in a steering wheel, on a vehicle roof, on a windshield, on a rear-view mirror, or on a pillar, for example on an A-pillar and/or a B-pillar of the vehicle 20, or at another location in the vehicle 20.

For observing the vehicle occupant 24, the observation device 22 can comprise a recording unit. In a further development, the observation device 22 can comprise an illumination unit for emitting light beams, in particular infrared light beams. Alternatively, the observation device 22 can itself not comprise a separate illumination unit and the vehicle interior or the vehicle occupants are illuminated by means of light from an environment.

The illumination unit is in particular directed toward the vehicle occupant 24 and thus toward the vehicle seat 27 in order to illuminate the vehicle occupant 24 with light beams, in particular with infrared light beams. In other words, light beams, in particular infrared light beams, can be emitted toward the vehicle occupant 24 by means of the illumination unit. The illumination unit can be configured as a light unit, light element, light diode, LED, OLED and/or laser diode, for instance, and/or comprise a light unit, a light element, a light diode, an LED, OLED and/or a laser diode.

The recording unit can be configured as an image recording unit, for instance, for example as a sensor or a camera, in particular as an infrared camera module, wherein the recording unit is directed toward the vehicle occupant 24 and thus toward the vehicle seat 27 in order to visually acquire the vehicle occupant 24. The configuration as an infrared camera module makes it possible to carry out the observation even at night without brightly illuminating, and thereby bothering or blinding, the vehicle occupant 24.

In other words, the observation device 22 is configured to observe a vehicle interior of a vehicle. The observation device 22 can comprise an illumination unit for emitting light beams, for example infrared light beams, toward the vehicle interior and a recording unit for capturing light beams, for example infrared light beams. The light beams emitted by the illumination unit can preferably be reflected on or in the vehicle interior, wherein the reflected light beams can be directed toward the recording unit.

The observation device 22 further comprises a control unit 28 or an evaluation unit 28 or a computing unit 28 for controlling the illumination unit and/or the recording unit and/or for processing the data recorded by means of the recording unit.

Figure 2:
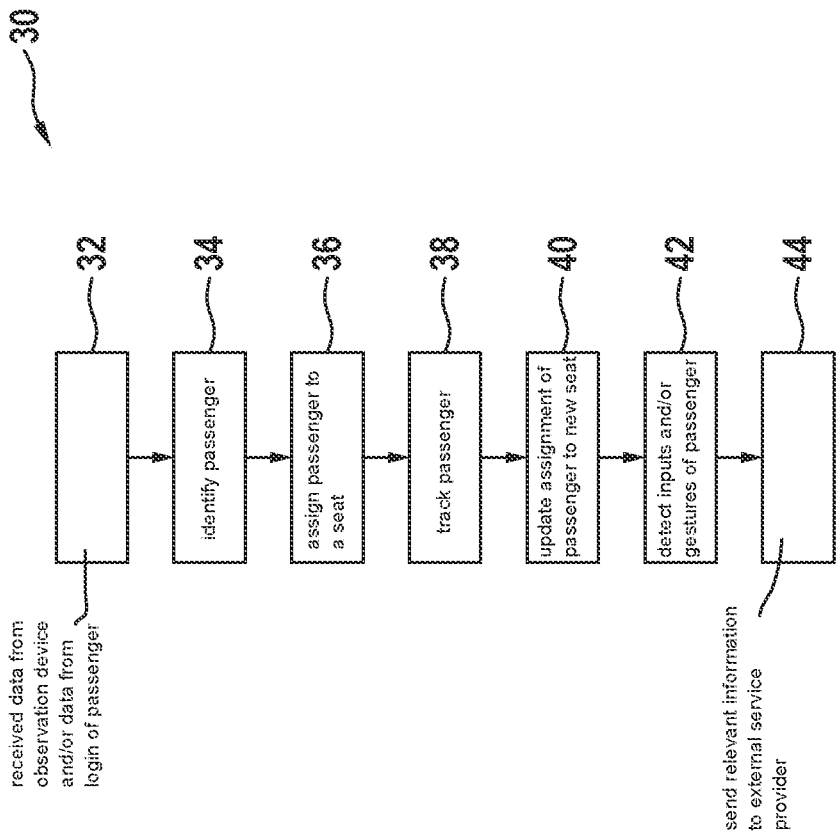
FIG. 2 shows a schematic illustration of a method according to an embodiment example of the present invention.

FIG. 2 shows a schematic illustration of a method 30 for monitoring a passenger in a vehicle according to an embodiment example of the present invention. The vehicle can be configured like the vehicle according to FIG. 1, for example. The method 30 can be carried out using a system like the system according to FIG. 6 and/or FIG. 7.

In a first step 32 of the method 30, data from an observation device and/or data from a login of the passenger to a local network of the vehicle are received. The data from an observation device can, for instance, be recorded or ascertained by means of an observation device. The vehicle can be equipped with a local network, for instance, in which case the passenger can log into the local network. The passenger can log into the local network using his or her smartphone, for example. The resulting data can be received in first step 32.

In a second step 34 of the method 30, the passenger in the vehicle is identified by means of the received data. The passenger can be identified using an evaluation algorithm, for instance, in particular an image evaluation algorithm. Identification can, for instance, take place via facial recognition, a fingerprint sensor, a login process or in some other way. Identifying the passenger can advantageously provide information about a name, gender, age and/or a photo of the passenger. In a further development, a pose of the passenger can be estimated in connection with the assignment of an identity. A pose is a set of coordinates of representative body parts and therefore an abstraction with reduced information content.

The passenger can preferably create a user account with his or her data, for instance, wherein in particular his or her face, body and/or pose are learned. This allows the passenger to be identified using the learned data.

In a third step 36 of the method 30, the passenger is assigned to a seat in the vehicle. A seat number or a number of a seat of the passenger can advantageously be ascertained. In other words, it is possible to ascertain which seat the passenger is sitting or has taken a seat on.

In a fourth step 38 of the method 30, the passenger is tracked in the event of a possible change of seat to a new seat. In other words, the passenger can be tracked in the vehicle. It is thus possible to detect when the passenger changes his or her seat. In particular updated data from an observation device can be used to track the passenger through a change of seat. In other words, data from an observation device can be evaluated, as a result of which it can be seen that the passenger is changing or has changed his or her seat.

Preferably, a pose of the passenger can be estimated in order to track the passenger through a possible change of seat. The pose is in particular an abstraction of the person. The pose can advantageously be used to track the passenger. If the passenger changes seats, the passenger has to move. The one or more poses or the change of poses, for example the movement of the individuals, can in particular be learned in advance. Learning in is in particular useful for robust person detection from all viewing angles and for all possible body postures.

In a fifth step 40 of the method 30, the assignment of the passenger to the new seat is updated when a change of seat to the new seat is detected. If a passenger changes seats, the passenger is assigned to the new seat in this fifth step. In other words, it is detected that the passenger has changed to a new seat and this seat is assigned to the passenger. The new seat with the new seat number is advantageously assigned to the passenger.

In a sixth step 42 of the method 30, inputs and/or gestures of the passenger are detected and it is ascertained whether the passenger wants to trigger or is triggering an alarm. The passenger can, for instance, press buttons, say a specific codeword and/or carry out a defined gesture. This can be detected; thereby ascertaining that the passenger wants to trigger an alarm. The passenger can trigger an alarm if he or she feels threatened, for example, and is therefore in a dangerous situation, and/or if the passenger is suffering a health emergency. The triggered alarm can be put through to an external server and/or a provider of the vehicle and/or to a security service provider and/or to the police and/or to an emergency service, for instance.

In a seventh step 44 of the method 30, relevant information about the passenger and the current seat is sent to an external service provider when it is detected that the passenger wants to trigger or has triggered an alarm. Relevant information about the passenger and the current seat can preferably be information about the passenger, about the passenger's trip, about possible further passengers and/or about the vehicle. The current seat can be the original seat or the new seat.

The external service provider can be configured as a provider of the vehicle and/or a security service provider and/or the police and/or an emergency service, for example.

Figure 3:
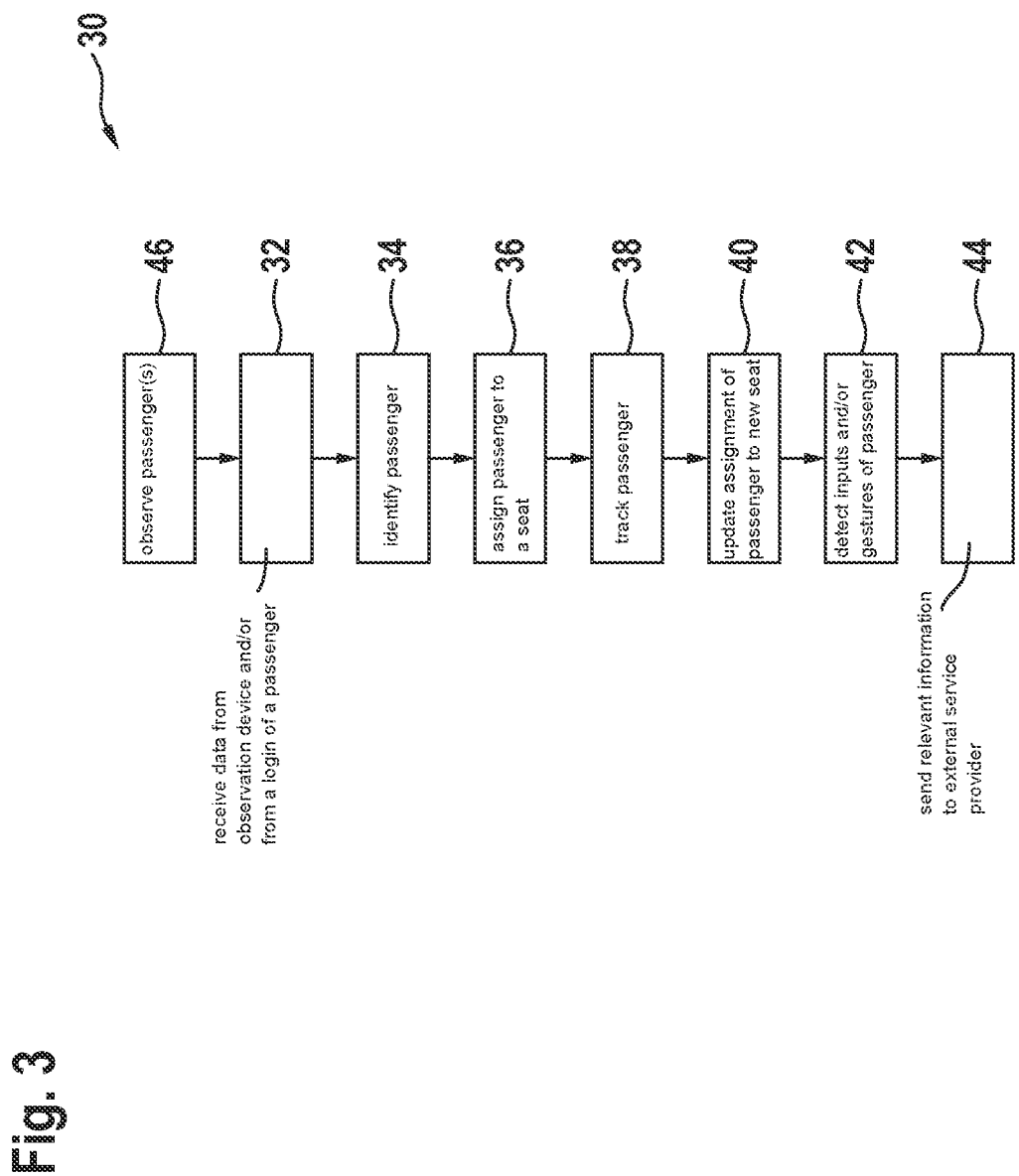
FIG. 3 shows a schematic illustration of a method according to an embodiment example of the present invention.

FIG. 3 shows a schematic illustration of a method 30 for monitoring a passenger in a vehicle according to an embodiment example of the present invention. The vehicle can be configured like the vehicle according to FIG. 1, for example. The method 30 can be carried out using a system like the system according to FIG. 6 and/or FIG. 7. The method 30 according to FIG. 3 can be configured like the method 30 according to FIG. 2, for instance. The method 30 according to FIG. 3 can thus in particular comprise the steps of the method 30 according to FIG. 2; thus a first step 32, a second step 34, a third step 36, a fourth step 38, a fifth step 40, a sixth step 42 and a seventh step 44.

The method 30 according to FIG. 3 further comprises an eighth step 46. In the eighth step 46 of the method 30, one or more passengers are observed by means of an observation device. The eighth step 46 can in particular be carried out before the first step 32. Alternatively or additionally, the eighth step 46 can be carried out continuously throughout the method. The observation device can therefore continuously provide data from the vehicle interior, for example. The observation device can, for instance, be configured like the observation device according to FIG. 1. The observation device can be used to ascertain or create data or observation data, wherein said data is received in the first step 32. Using this data, the passenger can, for instance, be identified and/or assigned to a seat.

Figure 4:
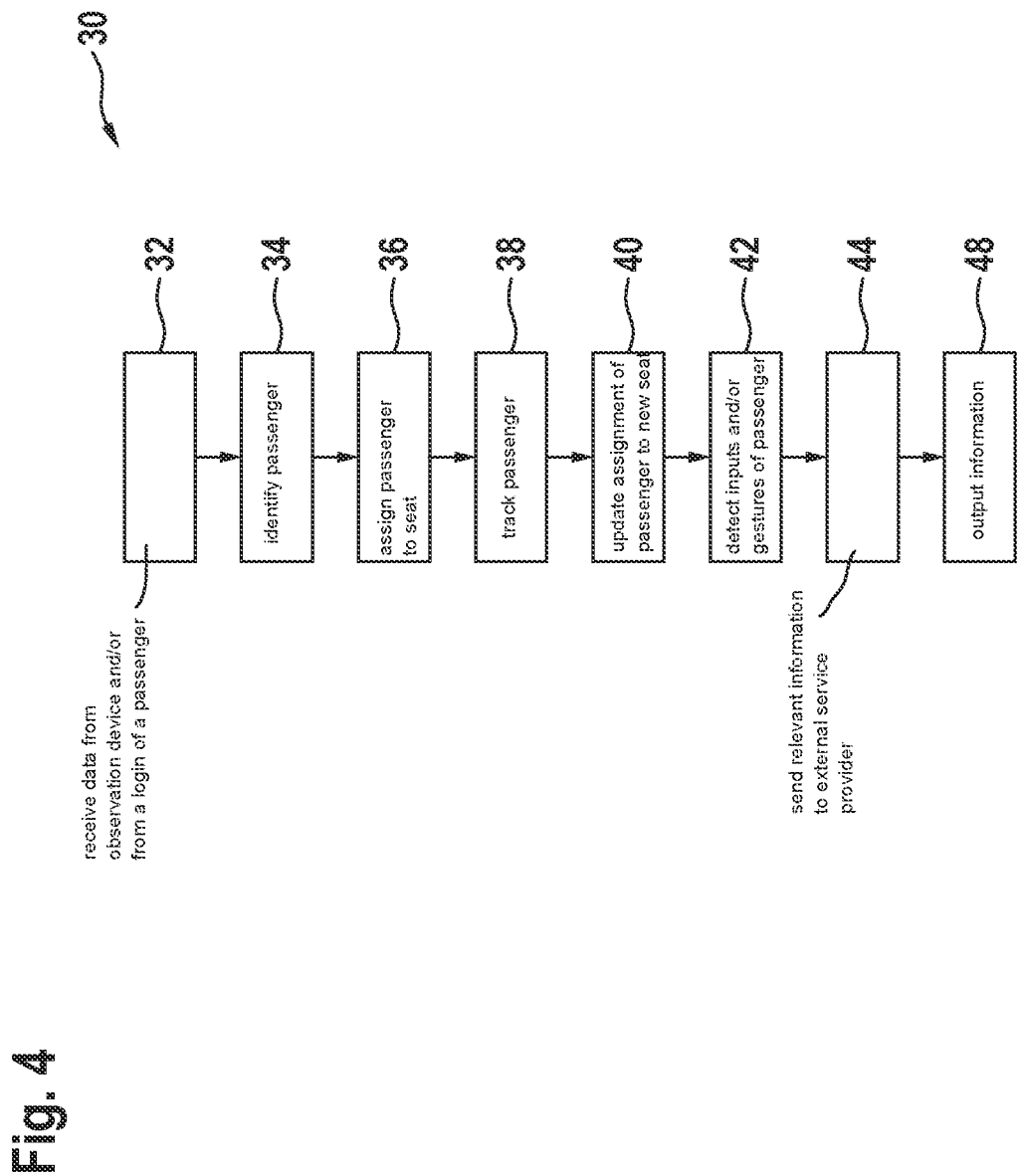
FIG. 4 shows a schematic illustration of a method according to an embodiment example of the present invention.

FIG. 4 shows a schematic illustration of a method 30 for monitoring a passenger in a vehicle according to an embodiment example of the present invention. The vehicle can be configured like the vehicle according to FIG. 1, for example. The method 30 can be carried out using a system like the system according to FIG. 6 and/or FIG. 7. The method 30 according to FIG. 4 can be configured like the method 30 according to FIG. 2 and/or FIG. 3, for instance. The method 30 according to FIG. 4 can thus in particular comprise the steps of the method 30 according to FIG. 2; thus a first step 32, a second step 34, a third step 36, a fourth step 38, a fifth step 40, a sixth step 42 and a seventh step 44. In a further development, the method 30 according to FIG. 4 can in particular comprise the eighth step 46 of the method 30 according to FIG. 3.

The method 30 according to FIG. 4 further comprises a ninth step 48. In the ninth step 48 of the method 30, information is output when a triggering of an alarm by the passenger is detected, wherein the information is output by means of one or more user interfaces. The ninth step 48 can in particular be carried out after the seventh step 44. A possible output, for example, is that the alarm has been detected and/or that help is on its way. Alternatively or additionally, instructions can be output.

The one or more user interfaces can advantageously be configured as an output device, as an interface to an output device and/or as an interface to a personal smartphone of the passenger. The output device can be configured as a display device or a speaker, for example.

In a further development, the information output can be visible only to the passenger who triggered the alarm. For example, the information can be displayed on a display device that is only in the field of view of the passenger who triggered the alarm. Alternatively or additionally, the information can be output, for example displayed, on the passenger's smartphone.

Figure 5:
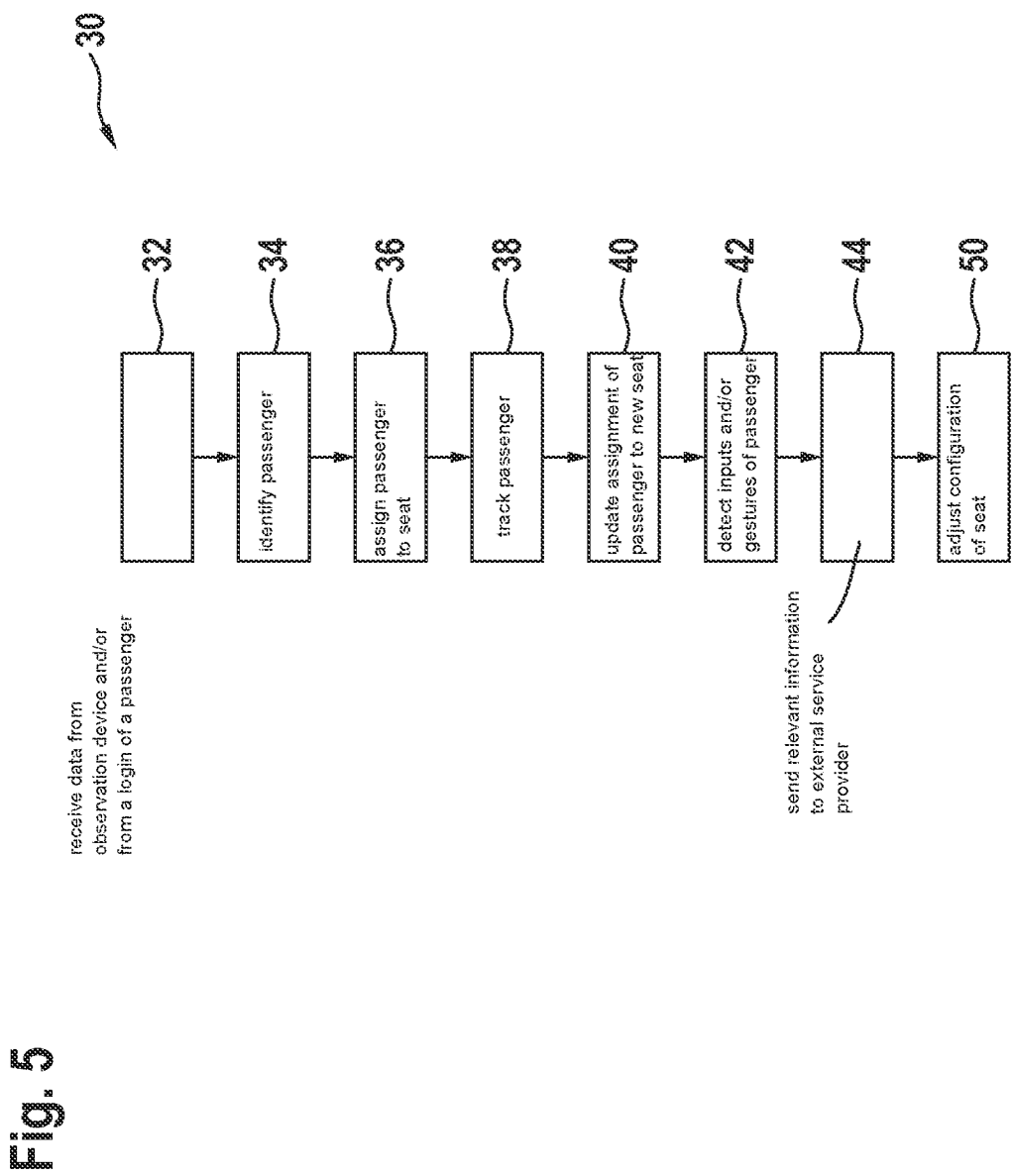
FIG. 5 shows a schematic illustration of a method according to an embodiment example of the present invention.

FIG. 5 shows a schematic illustration of a method 30 for monitoring a passenger in a vehicle according to an embodiment example of the present invention. The vehicle can be configured like the vehicle according to FIG. 1, for example. The method 30 can be carried out using a system like the system according to FIG. 6 and/or FIG. 7. The method 30 according to FIG. 5 can be configured like the method 30 according to FIG. 2. FIG. 3 and/or FIG. 4, for instance. The method 30 according to FIG. 5 can thus in particular comprise the steps of the method 30 according to FIG. 2; thus a first step 32, a second step 34, a third step 36, a fourth step 38, a fifth step 40, a sixth step 42 and a seventh step 44. In a further development, the method 30 according to FIG. 5 can in particular comprise the eighth step 46 of the method 30 according to FIG. 3. In a further development, the method 30 according to FIG. 5 can in particular comprise the ninth step 48 of the method 30 according to FIG. 4.

The method 30 according to FIG. 5 further comprises a tenth step 50. In the tenth step 50 of the method 30, a configuration of the seat is adjusted depending on the identified passenger. A setting of the seat, a height and/or an inclination of the backrest, and/or settings of an entertainment system can be adjusted, for instance. The seat or the configuration of the seat can be configured as in FIG. 10, for example.

Figure 6:
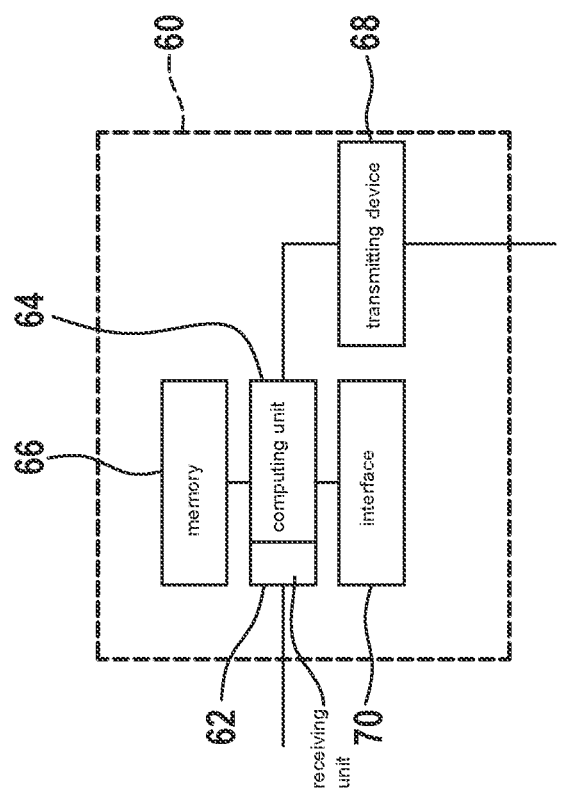
FIG. 6 shows a schematic illustration of a system according to an embodiment example of the present invention.

FIG. 6 shows a schematic illustration of a system 60 for monitoring a passenger in a vehicle according to an embodiment example of the present invention. The system 60 can, for example, be used to implement the method according to FIG. 2, FIG. 3, FIG. 4, and/or FIG. 5.

The system 60 comprises a receiving unit 62, wherein the receiving unit 62 is configured to receive data from an observation device and/or data from a login of the passenger to a local network of the vehicle. Receiving by means of the receiving unit 62 can be carried out as in the first step according to the method according to FIG. 2, FIG. 3, FIG. 4 and/or FIG. 5, for example. Data from the observation device can advantageously be received continuously.

The system 60 further comprises a computing unit 64, wherein the computing unit 64 is configured to identify the passenger in a vehicle, in particular according to the second step of the method, to assign the passenger to a seat in the vehicle, in particular according to the third step of the method, to track the passenger through a possible change of seat to a new seat, in particular according to the fourth step of the method, to update the assignment of the passenger to the new seat, in particular according to the fifth step of the method, when a change of seat to the new seat is detected, and to detect inputs and/or gestures of the passenger, in particular according to the sixth step of the method, and ascertaining whether the passenger wants to trigger or is triggering an alarm. For this purpose, an evaluation algorithm or specific evaluation algorithms can be executed on the computing unit 64. The computing unit 64 can be fed data from a memory 66, for example. For example, user profiles can be stored in the memory 66. The user profiles can be learned using machine learning, for instance.

The system 60 further comprises a transmitting device 68 configured to send relevant information about the passenger and the current seat to an external server when it is detected that the passenger wants to trigger or has triggered an alarm, in particular according to the seventh step of the method. The current seat can be the original seat or the new seat.

In a further development, the system can comprise an interface 70 to one or more user interfaces. The user interfaces can be disposed in the vehicle or on the vehicle, for instance, for example on a seat. Alternatively or additionally, the user interfaces can be configured as a smartphone of the passenger. The passenger can in particular provide inputs via the one or more user interfaces. The passenger can, for instance, trigger an alarm via the user interface, in which case said alarm is forwarded via the interface. The one or more user interfaces can alternatively or additionally be used to display information for the passenger.

In a further development, the system can also comprise an observation device for observing the passenger, wherein the passenger can be identified by means of data from the observation device. The observation device is used to ascertain or measure data or observation data, wherein the data or observation data are received by means of the receiving unit 62. The step of observing can be carried out according to the eighth step of the method, for example.

Figure 7:
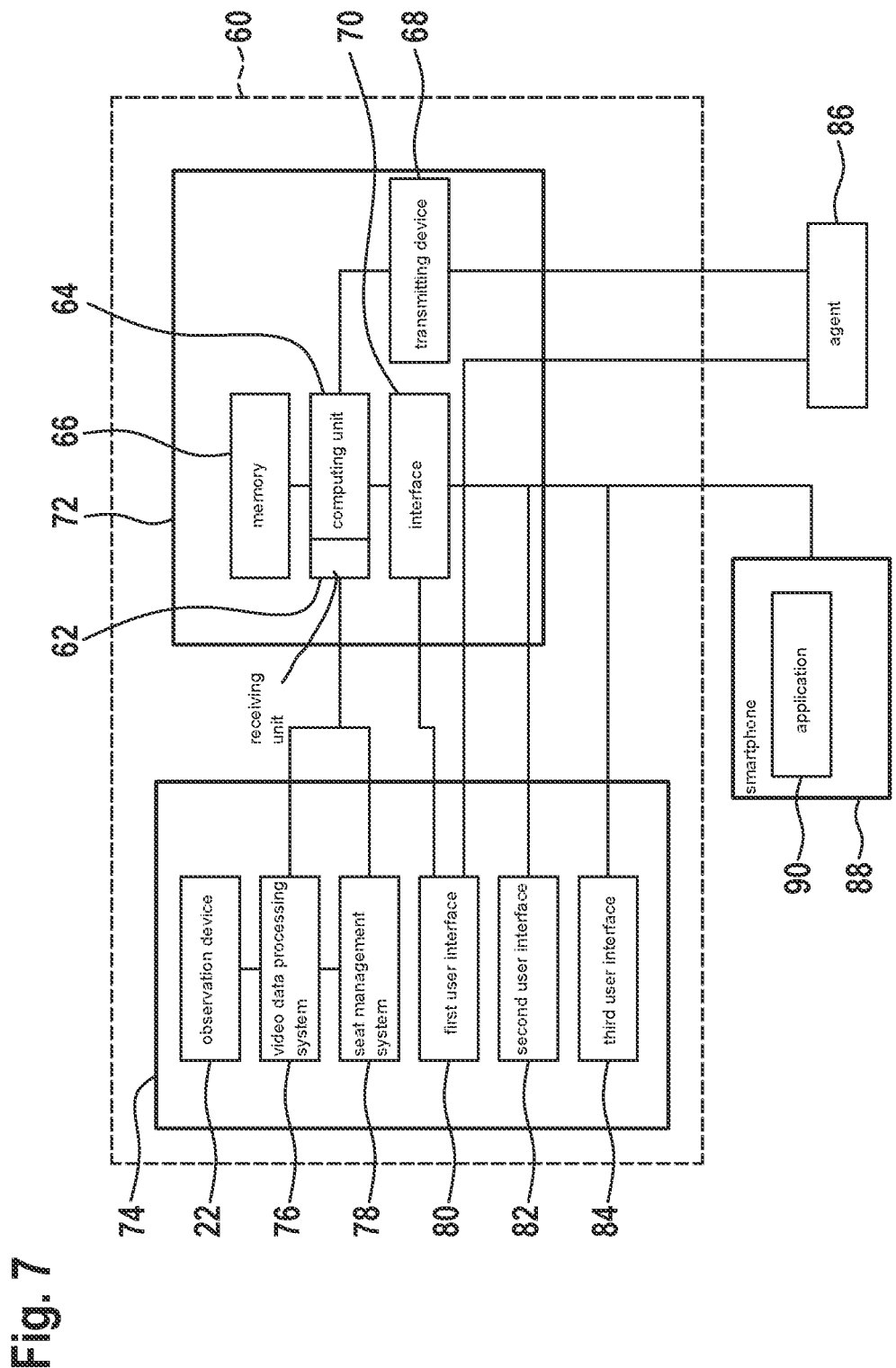
FIG. 7 shows a schematic illustration of a system according to an embodiment example of the present invention.

FIG. 7 shows a schematic illustration of a system 60 for monitoring a passenger in a vehicle according to an embodiment example of the present invention. The system 60 can, for example, be used to implement the method according to FIG. 2, FIG. 3, FIG. 4, and/or FIG. 5. The system 60 can in particular be configured like the system 60 according to FIG. 6.

The system 60 thus comprises a receiving unit 62, a computing unit 64, a memory 66, a transmitting device 68 and an interface 70 to one or more user interfaces according to FIG. 6. The receiving unit 62, the computing unit 64, the memory 66, the transmitting device 68 and the interface 70 are preferably components of a control center 72. The control center 72 can be disposed outside the vehicle on an external server, for instance. In an alternative embodiment, parts of the control center 72, for example the computing unit 64 and/or the receiving unit 62 and/or the interface 70 and/or the transmitting device 68, can be disposed in the vehicle.

In this advantageous embodiment according to FIG. 7, the system 60 further comprises a vehicle system 74. The vehicle system 74 is preferably disposed in the vehicle or is part of the vehicle. The vehicle can be configured like the vehicle according to FIG. 1, for example. In this advantageous embodiment, the vehicle system 74 comprises an observation device 22, in particular a camera 22, a video data processing system 76, a seat management system 78 and one or more user interfaces 80, 82, 84. In this example embodiment, vehicle system 74 can comprise a first user interface 80, a second user interface 82 and a third user interface 84. The observation device 22 can, for instance, be configured like the observation device 22 according to FIG. 1. The observation device 22 can preferably be used to observe the vehicle interior and/or one or more passengers, whereby in particular data or observation data are generated. This data can in particular be processed by means of the video data processing system 76 and/or the seat management system 78. The processed data are in particular sent to the control center 72 and the receiving unit 62 receives the data. The data can then be processed and analyzed, in particular by means of the computing unit 64. In an alternative embodiment, the video data processing system 76 and/or the seat management system 78 can also be part of the control center 72.

A passenger can trigger an alarm using a user interface, for instance, for example using the first user interface 80. This alarm can be forwarded to the computing unit via the interface 70. The computing unit can analyze the alarm and forward or send it to an external service provider, for example to a respective service provider or call center, via the transmitting device 68. The external server can be configured as a provider of the vehicle and/or a security service provider and/or the police and/or an emergency service, for example. Thus an alarm can be triggered, as a result of which an emergency call can be placed. The external service provider can initiate appropriate steps and, for instance, call the police and/or an ambulance, and thus come to the aid of the passenger. Alternatively or additionally, the alarm can be forwarded directly to a or the external service provider via the interface 70. In addition to the alarm, the external service provider can receive or obtain further information about the passenger, in particular his or her identity and/or his or her assigned seat. In addition to the alarm, the external service provider can advantageously forward further information about the passenger, in particular his or her identity and/or his or her assigned seat, to the police or the emergency service. The police or the emergency service, for example an ambulance, can thus come directly to the aid of the passenger who triggered the alarm.

Information can preferably be output to the passenger via one or more user interfaces 82, in particular via the interface 70. Information can be output to the passenger via the second user interface 82, for example. The second user interface 82 can be configured as a display device, an audio device or speaker, or as a further output device, for instance. Information can thus be displayed and/or read to the passenger.

In a further development, different settings can be personalized for the passenger via the interface 70 as a third user interface 84. Seat settings, such as a height or an inclination of the backrest, for example, can be set individually for the identified passenger assigned to said seat. In other words, the third user interface 84 can be configured as setting options for the vehicle seat that can be adapted to the passenger.

In a further development, information can be output to the passenger via the interface 70 to a smartphone 88 or other electronic device 88, in particular via an application 90 of the smartphone 88. Information that is sent to the smartphone via the interface can be displayed to the passenger on the smartphone 88, for instance. Instructions and/or information about the trip, for example, can be displayed to the passenger. In an alternative embodiment, the passenger can trigger the alarm via his or her smartphone 88 or the application 90 on the smartphone. The alarm can be forwarded to the computing unit 64 via the interface 70.

In other words, the system can be configured as a video-based monitoring system, in which case an identified passenger can be tracked using algorithms. This enables the on-board system to always take into account the user who is actually occupying the seat at that moment when processing data and providing services associated with the use of the user interfaces at the respective seat. The provision of user-specific services via seat-related user interfaces is maintained even in the event of a change of seat. If a silent alarm is triggered via a button on the seat, for example, data that is available in the on-board system for the person actually present in the area of the seat can be transmitted to a call center employee. This can be data that is critical to addressing the alarm and/or involving emergency services. Otherwise, a call center employee would potentially have to contact the person concerned to obtain further information and request personal data. However, in a threat scenario in which other vehicle occupants are involved, this procedure is problematic, because the latter should possibly not be made aware that the alarm has been triggered. In a further development, it is also possible to provide the passenger with personalized content via output devices associated with the seat, for example a screen or a speaker.

Figure 10:
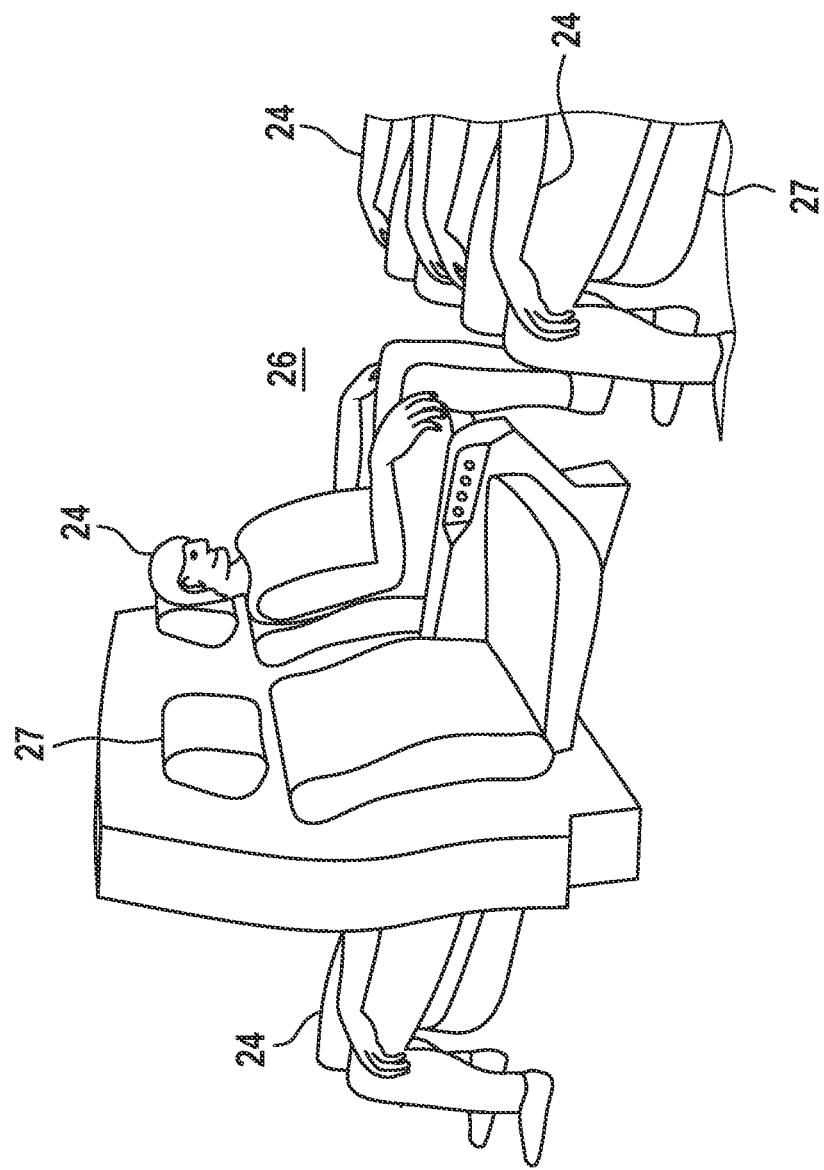
FIG. 10 shows a schematic illustration of an interior of a vehicle according to an embodiment example of the present invention.
Figure 11:
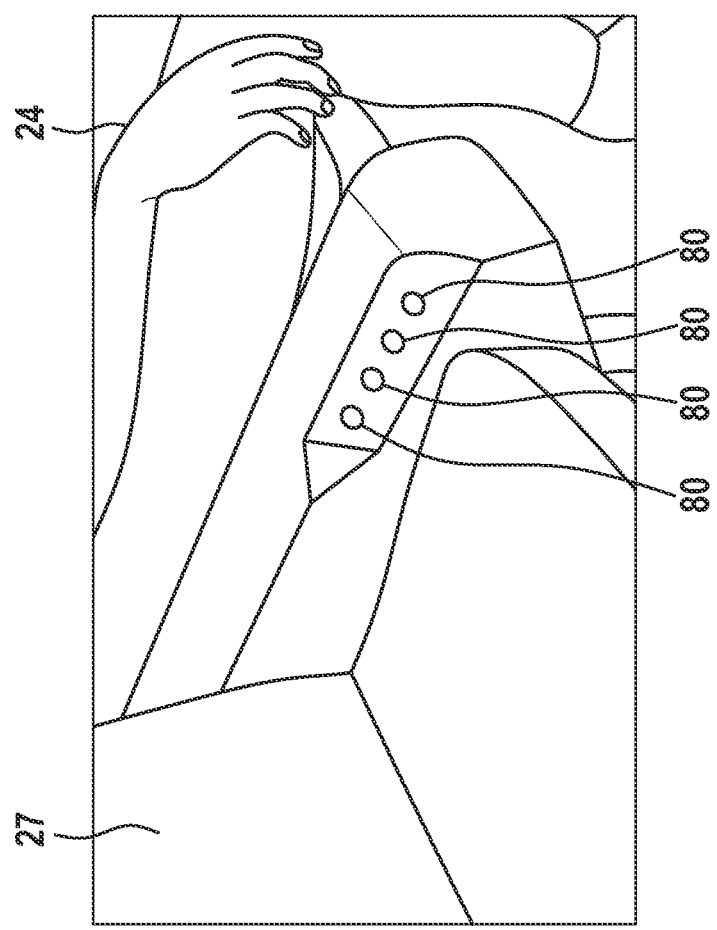
FIG. 11 shows a schematic illustration of a vehicle seat according to an embodiment example of the present invention.

The system can preferably be used in vehicles or means of transportation in which multiple passengers take part in a trip independently of one another, for example like the vehicle according to FIG. 10 and/or FIG. 11. The passengers can have different destinations and motives for traveling. The shown system can be used in public means of transportation, for instance, for example on a bus, a train or a shared taxi, but in particular also in private means of transportation, for example in pooled rides organized by ride-hailing service providers. The system can in particular be used in shared autonomous vehicles, as there is no driver or attendant to monitor what is happening inside the vehicle.

After getting in, the passenger can preferably be detected in the on-board system via a vehicle interior camera 22 with a downstream video data processing system 76. The detection or the video data processing 76 can alternatively or additionally also be carried out on an external server. This can be done by initially successfully estimating the person's pose and/or acquiring the passenger's face after he or she gets in, for example. After detection by the camera 22, the downstream video data processing system 76 is able to track the location of the user in the vehicle. For this purpose, the pose of the occupant can advantageously be estimated again at regular time intervals. A so-called pose tracker can be used as well, which can ensure a permanent and unambiguous assignment of the pose to the initially detected person even if the estimated pose changes over time. In a further development, a plurality of cameras 22 can be used, the fields of view of which overlap partially or the fields of view of which are seamlessly adjacent to one another. With such an arrangement, the pose can be assigned to an initially detected person at any time, even if the passenger leaves the field of view of a camera 22 and appears in the field of view of an adjacent camera 22. In principle, this also makes it possible to monitor vehicles with a larger interior, such as local public transport buses.

The video data processing system 76 in particular knows the position of the available seats. After detection, the video data processing system 76 assigns an identifier to the passenger. This identifier is subsequently stored by the system. In embodiment examples, the identifier is transmitted within a distributed system to a subsystem outside the vehicle, here in particular to the control center 72, and stored there, for example in the memory 66. This subsystem 72 is advantageously operated as a backend service in the cloud. Such a backend could typically be provided by a mobility service provider or a ride-hailing service provider. If the user or passenger has booked the trip via a mobile application of a mobility service provider or a ride-hailing service provider, trip data, such as a start and/or destination, and in particular personal data of the user are advantageously available via said backend. Personal settings for seat-related user interfaces in the vehicle can moreover also be stored in this backend.

The video data processing system 76 recognizes when a detected and tracked passenger occupies a seat, for example by determining whether the support points of the pose, which can also be referred to as keypoints, are located within a seat geometry known to the video system. An assignment between the seat and the passenger-related identifier is then made within a seat management system 78, which can be located in or outside the vehicle.

In a further development, the passenger can carry out a login process using a mobile terminal device immediately after getting in, for example as soon as he or she has occupied a seat. The login can be made via a local network provided by the vehicle system. Or the login can also be made at a server outside the vehicle which can be accessed from the terminal device via an Internet connection. The passenger can be prompted to confirm the occupied seat, for instance. To make the login reliable and avoid incorrect inputs, it is also possible for the user to enter an identification number that is displayed in the vehicle and is only visible from this seat, for example. Alternatively or additionally, reading in a QR code attached to or displayed on the seat is possible as well. Another possible implementation is a login process at the seat via NFC.

In the backend, the passenger-related identifier, which was assigned by the video system or the evaluation algorithm, can now be uniquely assigned to a known user or passenger. If a passenger changes seats after the initial login process, the pose tracker can be used to track which seat the person concerned has now occupied. If such a change has been detected, the seat management system 78 updates the data set for that person and assigns him or her the new seat number.

The combination of the video data processing system 76, the seat management system 78 and the backend with user and trip data allows existing user data to advantageously be used when passengers access user interfaces at the seat. These utilization options are advantageously retained even in the event of a change of seat.

One advantageous embodiment provides buttons disposed on the seat, for instance, via which the passenger can access services. The buttons can be configured according to FIG. 11, for example. Such a button can be used to trigger a silent alarm, for instance. When the button is pressed, the on-board system can use a backend call to request a call center employee or agent 86 to handle the incident. The overall system then provides the agent 86 with further data via a backend interface. In an advantageous implementation, the agent could be provided with the first and last name, gender, age and a photograph of the person who triggered the alarm, for instance. For this purpose, the passenger-related identifier is requested first in the seat management system 78 when the alarm is triggered. A message is then created that contains this identifier and also the seat number. This message is then sent to the backend outside the vehicle. Further data, such as personal data of the user, data about the trip of the person concerned, data about further trip participants and about the vehicle, can then be compiled in the backend on the basis of the identifier. This data can be provided to the call center employee 86 who is responding to the incident. The agent will then make a decision whether emergency services should be notified. If the police are called, for instance, the agent or another call center employee can pass on the existing data. If the alarm was triggered because a passenger was threatened by another trip participant, for example, the police can use the available information when they arrive at the scene to quickly clarify the situation and identify offenders. Without the information provided via the on-board system and the backend and passed on by the agent to the emergency services, the police could potentially encounter a group of people in which is not clear who triggered the alarm. The person at risk may also not be able to speak freely in this situation, because the threat continues unnoticed, for example due to the threat of physical violence if the person at risk were to expose the person posing the threat.

It is also possible that a call center employee 86 specifically addresses the person at risk prior to the arrival of any requested emergency services via an output device 82 disposed on the seat and provides further guidance. Such content could be displayed on a screen that is only visible from the seat of the person at risk, for example. An assignment of the person concerned to a seat that is available and also robust against changing seats can be used for this purpose.

In addition to the described emergency scenarios, other services that are tailored to the user who is actually present are possible too. A button that triggers the output of trip information, for instance, is possible. If multiple occupants with different destinations are using the vehicle, the respective relevant information can be output depending on the user. An announcement or a screen display of the expected travel time to the individual destination, for instance, is possible.

Figure 8:
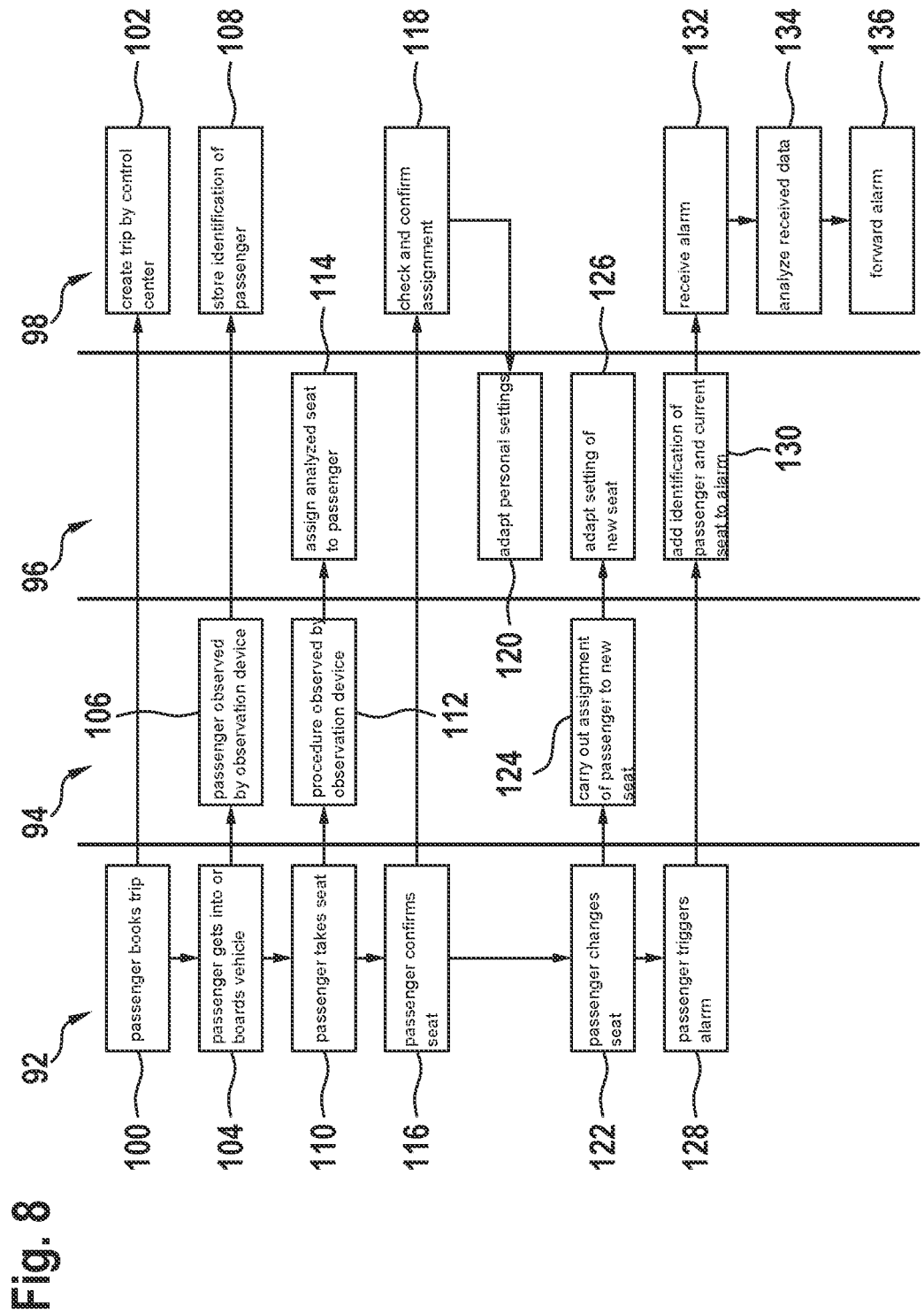
FIG. 8 shows a schematic illustration of a method according to an embodiment example of the present invention.

FIG. 8 shows a schematic illustration of a method according to an embodiment example of the present invention. The method can be configured like the method according to FIG. 2, FIG. 3, FIG. 4, and/or FIG. 5. The method can in particular be carried out using a system according to FIG. 6 and/or FIG. 7.

In this advantageous embodiment, the method is shown as a flowchart and the method steps are organized into four different columns. The steps of the passenger are included in a first column 92. In other words, the steps that are carried out by the passenger are included or shown in the first column 92. The steps of the observation device in the vehicle are shown in a second column 94. The steps of the seat management system are shown in a third column 96. The steps of the control center are shown in a fourth column 98.

In a first step 100, which is included in the first column 92, the passenger books a trip. This results in the creation of a trip for the passenger by means of the control center in a second step 102 in the fourth column 98. The passenger is advantageously registered as a user in the control center. In a third step 104 in the first column 92, the passenger gets into the vehicle or the passenger boards the vehicle. In a fourth step 106 in the second column 94, the passenger is observed by means of the observation device. The data from the observation device can be analyzed in the fourth step 106 or in a further fifth step 108. In the fifth step 108 in the fourth column, the identification of the passenger is also stored. In a sixth step 110 in the first column 92, the passenger takes a seat. This procedure is observed in a seventh step 112 in the second column 94 by means of the observation device. The data created by means of the observation device can be analyzed in the seventh step 112 or in a further step in the fourth column 98. This can be used to analyze which seat the passenger has occupied, wherein in particular the seat number can be analyzed. In an eighth step 114 in the third column 96, the analyzed seat is assigned to the passenger or the identity of the passenger. In one advantageous embodiment, one or more settings of the seat can in particular be personalized for the identified passenger. In other words, the seat can be adjusted to the passenger's personal settings.

In a ninth step 116 in the first column 92, the passenger can confirm the seat, for example using his or her smartphone. The confirmation can, for instance, be used to check and confirm the assignment of the identified passenger to the seat in a tenth step 118 in the fourth column 98. In an alternative embodiment, in an eleventh step 120 in the third column 96, personal settings, for example of the seat, can be adapted to the identified passenger.

In a twelfth step 122 in the first column 92, the passenger changes from the first seat to a second seat. This change can in particular be observed using the thirteenth step 124. The assignment of the passenger to the new seat can be carried out in in the twelfth step 122 or in a further step in the fourth column 98. In a further development, the setting of the new seat can be adapted to the passenger in a fourteenth step 126 in the third column 96. The status of the first seat can be furthermore be marked as empty.

In a fifteenth step 128 in the first column 92, the passenger can trigger an alarm, for example trigger a silent alarm, for example by pressing an alarm button. In a sixteenth step 130 in the third column 96, an identification of the passenger and the current seat number are added to the alarm. The sixteenth step 130 can alternatively also be placed into the fourth column 98. In a seventeenth step 132 in the fourth column 98, the control center can receive the alarm triggered by the passenger. In an eighteenth step 134, the received data can be analyzed by the control center, wherein the identity of the passenger and his or her data of the booked trip can be analyzed. In a nineteenth step 136 in the fourth column 98, the alarm can be forwarded to a respective service. The police and/or an ambulance can be alerted, for instance. The data relating to the identity of the passenger and his or her seat can be passed on.

Figure 9:
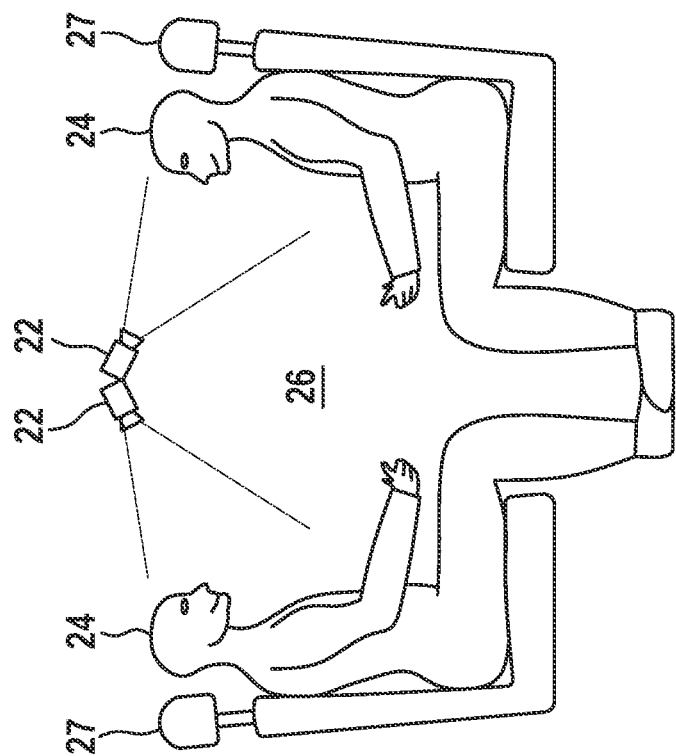
FIG. 9 shows a schematic illustration of an interior of a vehicle according to an embodiment example of the present invention.

FIG. 9 shows a schematic illustration of an interior 26 of a vehicle according to an embodiment example of the present invention. The vehicle can be configured like the vehicle according to FIG. 1, for example. By means of the vehicle, the system can be implemented like the system according to FIG. 6 and/or FIG. 7. In this advantageous embodiment, two observation devices 22, in particular a first camera 22 and a second camera 22, by means of which the passengers 24 can be observed, are disposed in the interior space 26 of the vehicle. A plurality of seats 27 are arranged in the vehicle and passengers 24 are seated on the seats. The passengers can thus be assigned to the respective seats.

FIG. 10 shows a schematic illustration of an interior 26 of a vehicle according to an embodiment example of the present invention. The vehicle can be configured like the vehicle according to FIG. 1, for example. By means of the vehicle, the system can be implemented like the system according to FIG. 6 and/or FIG. 7. There are a plurality of seats 27 in the vehicle and passengers 24 are seated on the seats. The passengers can thus be assigned to the respective seats. In this advantageous embodiment, one seat comprises a plurality of user interfaces. The user interfaces can in particular be configured like the user interfaces according to FIG. 11.

FIG. 11 shows a schematic illustration of a vehicle seat 27 of a vehicle according to an embodiment example of the present invention. The vehicle seat 27 can be configured like the vehicle seat 27 according to FIG. 9 and/or FIG. 10. The vehicle can be configured like the vehicle according to FIG. 1, for example. By means of the vehicle, the system can be implemented like the system according to FIG. 6 and/or FIG. 7. In this advantageous embodiment, the vehicle seat 27 comprises a plurality of user interfaces 80. The passenger can, for instance, use the user interfaces to trigger an alarm. The user interfaces can be configured as push buttons, for example. In a further development, the user interface can be configured as a display device or a display.

What is claimed is:

1. A method for monitoring a passenger in a vehicle, comprising the following steps:
   receiving data from an observation device and/or data from a login of the passenger to a local network of the vehicle;
   identifying the passenger in the vehicle using the received data;
   assigning the passenger to a seat in the vehicle;
   tracking the passenger in the event of a possible change of seat to a new seat, wherein, for tracking the passenger through a possible change of seat, a pose of the passenger is estimated, the pose being a set of coordinates of representative body parts;
   updating the assignment of the passenger to a new seat when a change of seat to a new seat is detected;
   detecting inputs and/or gestures of the passenger and ascertaining whether the passenger wants to trigger or is triggering an alarm; and
   sending relevant information about the passenger and a current seat of the passenger to an external server when it is detected that the passenger wants to trigger or has triggered an alarm.

2. The method according to claim 1, wherein, in the step of identifying the passenger in the vehicle, information about a name, and/or a gender, and/or an age, and/or a photo of the passenger is provided.

3. The method according to claim 1, wherein, in the step of sending relevant information about the passenger and the current seat to an external server, information is sent: (i) about the passenger, and/or (ii) about the passenger's trip, and/or (iii) about possible further passengers, and/or (iv) about the vehicle.

4. The method according to claim 1, further comprising:
   observing the passenger using the observation device.

5. The method according to claim 1, further comprising:
   outputting information when a triggering of an alarm by the passenger is detected, wherein the output information is output using one or more user interfaces.

6. The method according to claim 5, wherein the one or more user interfaces is configured as: (i) an output device and/or as (ii) an interface to a smartphone of the passenger.

7. The method according to claim 5, wherein the output information is only visible to the passenger who triggered the alarm.

8. The method according to claim 1, further comprising:
   adjusting a configuration of the seat depending on the identified passenger.

9. A system for monitoring a passenger in a vehicle, comprising:
   a receiving unit configured to receive data from an observation device and/or data from a login of the passenger to a local network of the vehicle;
   a computing unit configured to:
     identify the passenger in the vehicle,
     assign the passenger to a seat in the vehicle,
     track the passenger through a possible change of seat to a new seat,
   wherein, to track the passenger through a possible change of seat, a pose of the passenger is estimated, the pose being a set of coordinates of representative body parts, update the assignment of the passenger to the new seat when a change of seat to the new seat is detected, and
detect inputs and/or gestures of the passenger and ascertaining whether the passenger wants to trigger or is triggering an alarm; and
a transmitting device configured to send relevant information about the passenger and the current seat to an external server when it is detected that the passenger wants to trigger or has triggered an alarm.

10. The system according to claim 9, further comprising:
an observation device configured to observe the passenger, wherein the passenger can be identified using data from the observation device.

11. The system according to claim 9, further comprising:
one or more user interfaces, wherein the passenger can provide inputs via the one or more user interfaces and/or and wherein information can be presented to the passenger via the one or more user interfaces.

* * * * *